Oct. 19, 1926.
H. A. DOUGLAS
1,603,587
TRANSMISSION GEAR LOCKING MECHANISM
Filed June 27, 1925   4 Sheets-Sheet 1
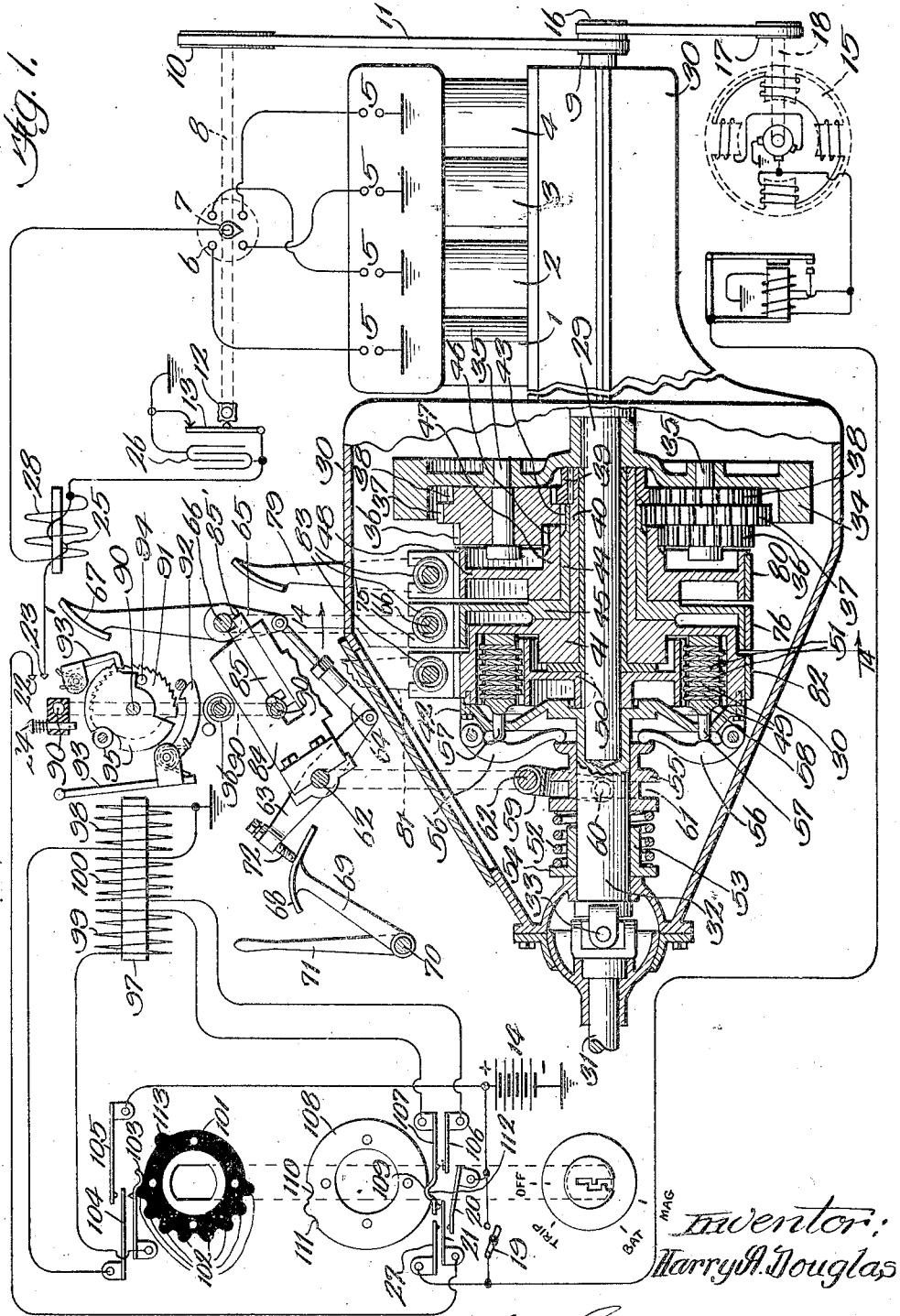

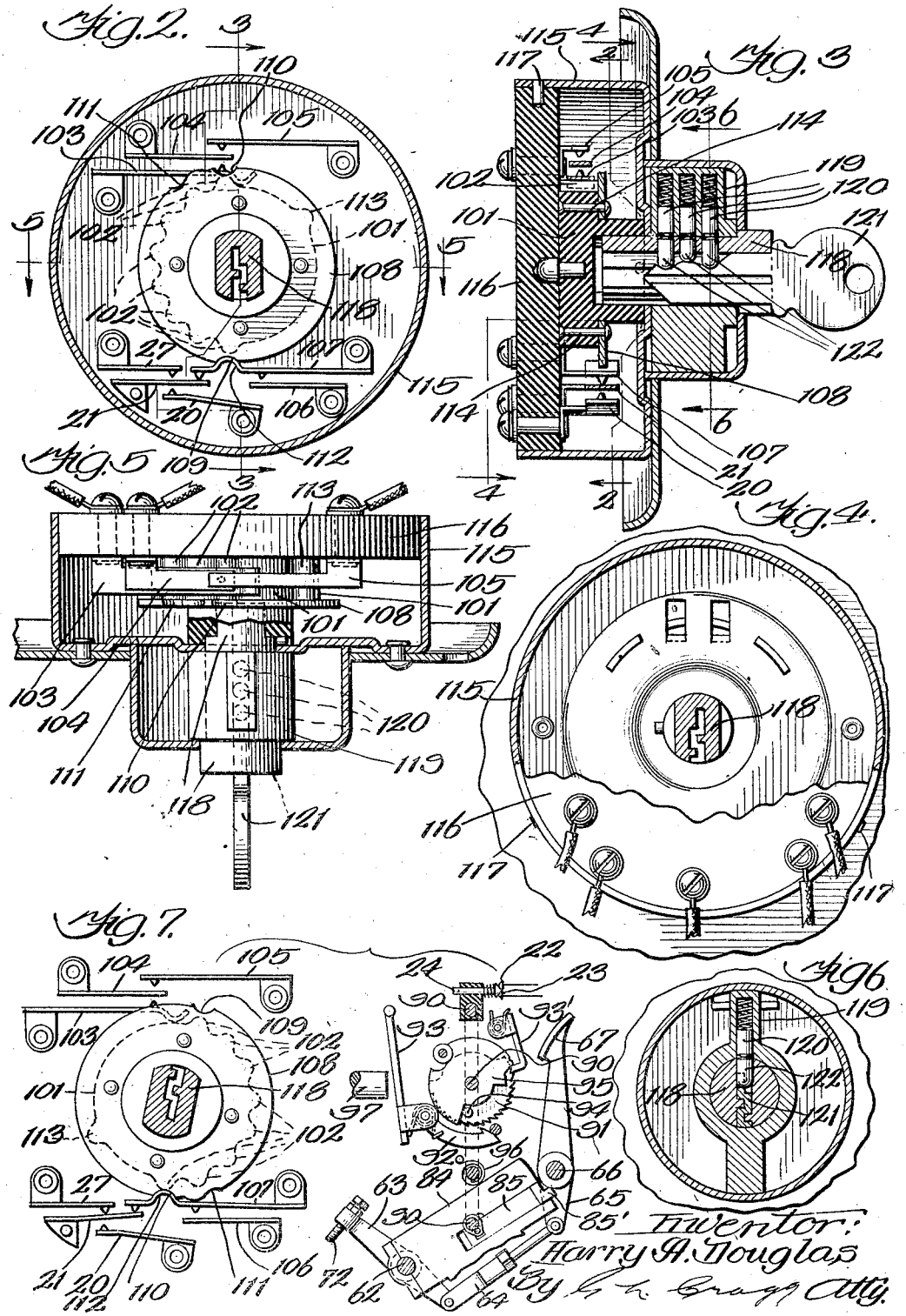

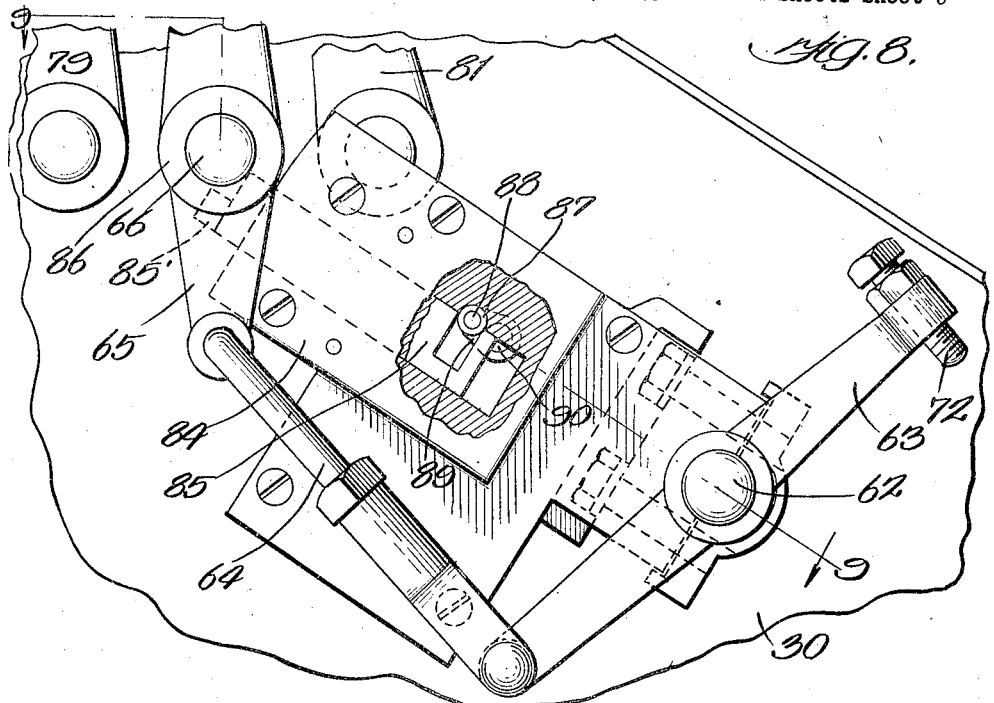
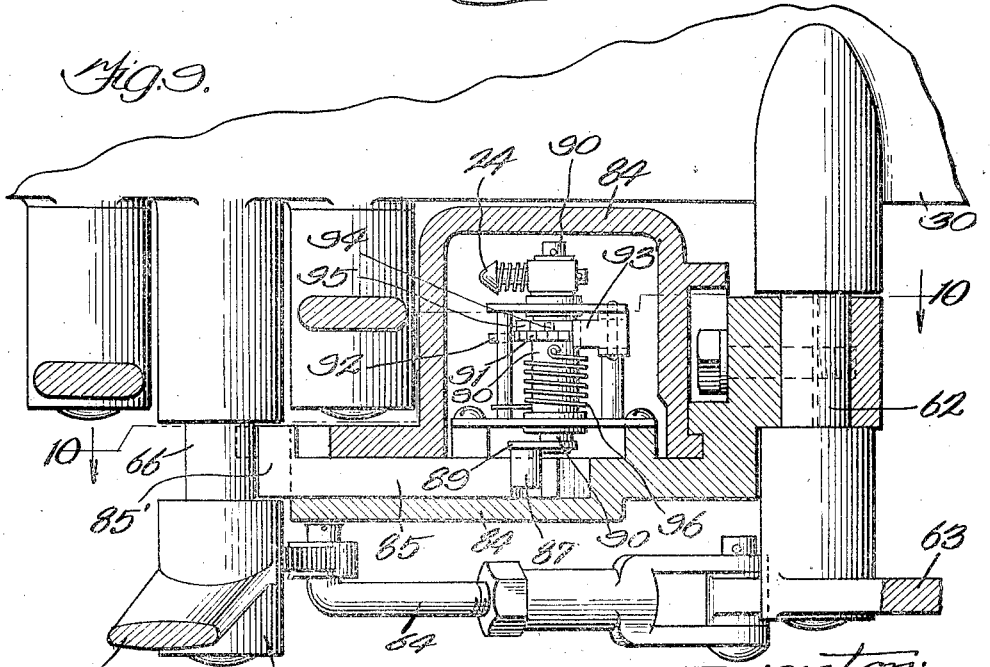

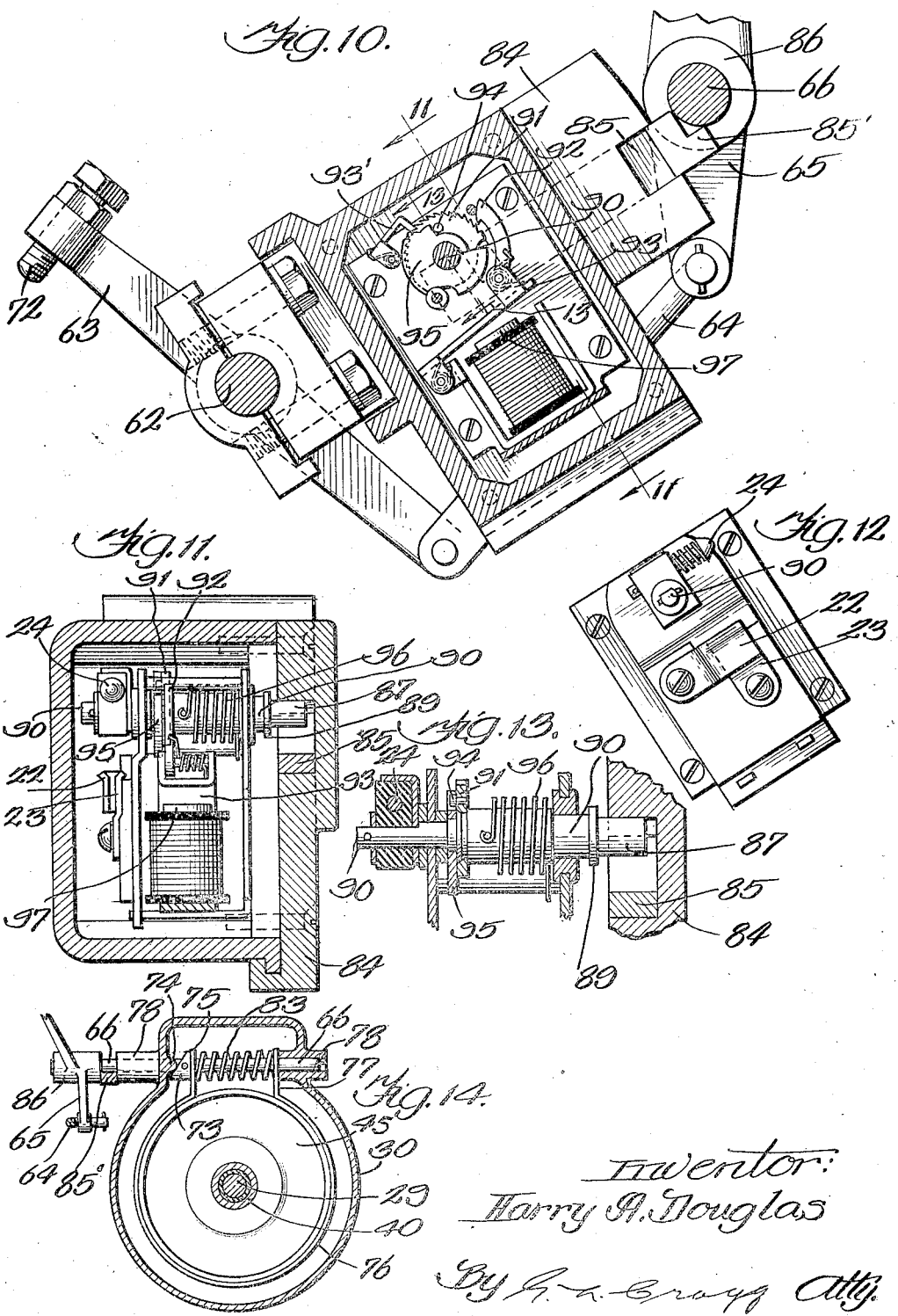

Patented Oct. 19, 1926.

1,603,587

UNITED STATES PATENT OFFICE.

HARRY A. DOUGLAS, OF BRONSON, MICHIGAN.

TRANSMISSION-GEAR-LOCKING MECHANISM.

Application filed June 27, 1925. Serial No. 40,083.

My invention relates to power plants, being of particular service in connection with those power plants which are employed for operating automotive vehicles. The invention resides in the provision of improved means for maintaining the transmission mechanism interposed between the engine of the power plant and its load out of service, the mechanism of my invention rendering it difficult for one unacquainted therewith to acquire the use of a power plant containing the same.

As I have preferably embodied the invention, the clutching mechanism which is employed for coupling the engine with the transmission gearing is maintained in an inoperative condition to lock the engine out of association with its load. Electro-magnetic mechanism is employed for releasing or placing the clutching mechanism into a usable condition, this electro-magnetic mechanism including a plurality of switches and, preferably a plurality of windings, each in a circuit individual thereto, and all requiring closure to make the electro-magnetic mechanism effective, any number of circuits less than the whole number of the circuits being itself incapable of effecting the operation of the electro-magnetic mechanism. Any person that is unfamiliar with the equipment, such as a thief desiring to steal an automobile, might not have so much difficulty in establishing one of these circuits but his difficulties would be increased if he seeks to establish them all, due to the confusion that would be experienced in selecting the proper conductors and effecting the connection thereof with the source of current employed to energize the windings. Time ordinarily would not permit of the experimentation required to gain simultaneous control over all the circuits.

The invention will be more fully explained in connection with the accompanying drawings in which Fig. 1 is a view, partially in elevation and partially in section of power transmission mechanism equipped with the controlling apparatus of my invention, the engine having this power transmission mechanism being diagrammatically indicated and the electromagnetic mechanism together with its controlling switching mechanism being also diagrammatically illustrated; Fig. 2 is a sectional view with the preferred form of switching mechanism which controls the electromagnetic mechanism, this figure being taken on line 2—2 of Fig. 3; Fig. 3 is a sectional view on line 3—3 of Fig. 2; Fig. 4 is a sectional view on line 4—4 of Fig. 3; Fig. 5 is a sectional view on line 5—5 of Fig. 2; Fig. 6 is a sectional view of a part of the structure appearing in Fig. 3 taken on line 6—6 of Fig. 3; Fig. 7 is a view showing a part of the equipment illustrated in Fig. 1 in changed position; Fig. 8 is a view of a portion of the transmission locking mechanism shown in Fig. 1, taken from the opposite side, portions being broken away and other portions being shown in section; Fig. 9 is a sectional view on line 9—9 of Fig. 8; Fig. 10 is a sectional view on line 10—10 of Fig. 9; Fig. 11 is a sectional view on line 11—11 of Fig. 10; Fig. 12 is a face view of the master ignition switch diagrammatically illustrated in Fig. 1; Fig. 13 is a section on line 13—13 of Fig. 10; and Fig. 14 is a sectional view somewhat on a reduced scale taken approximately on the line 14—14 of Fig. 1.

The power plant illustrated includes an internal combustion engine having four cylinders, 1, 2, 3 and 4, each cylinder having an ignition circuit inclusive of the sparking terminals 5, included in a conductor grounded at one end and connected with a contact 6 at its other end. The four contacts 6 of the four ignition circuits are arranged in a circular row which is concentric with a revoluble switching arm 7 adapted to engage the contacts 6 in succession. The switch arm 7 is carried upon a shaft 8 which is driven by the engine through the intermediation of an engine driven pulley 9 and a pulley 10 driven by the pulley 9 through the intermediation of a belt 11. The shaft 8 also carries a circuit interrupting cam wheel 12 that serves to vibrate the circuit interrupting switch 13 which is included in an inducing ignition circuit arranged to be supplied with current from the battery 14 of direct current, or from the direct current magneto generator 15, in accordance with common practice. The magneto generator 15 is driven by the pulley 16 upon the same shaft with the pulley 9, the pulley 16 driving the pulley 17 that is upon the shaft 18 on which the armature of the magneto generator is disposed, as is well understood by those skilled in the art. When it is desired to charge the battery a suitable switch is closed, the hand switch 19 being shown for this purpose by way of illustration.

In the system shown the battery 14 is included in the inducing circuit when the power plant is first set into operation, whereafter this battery is cut out of the inducing circuit and is replaced by the magneto generator 15 in this circuit. The inducing circuit when including the battery may be traced from ground through the battery, the switch contacts 20 and 21, master ignition switch contacts 22 and 23 bridged by the circuit closing contact 24, the inducing windings 25, through the grounded circuit interrupting switch 13, the switch being shunted by the condenser 26 in accordance with common practice. When the magneto is substituted for the battery in the inducing ignition circuit, the contact 21 is disengaged from the contact 20 and is engaged by the contact 27 which is connected with the ungrounded terminal of the magneto generator. The induced or secondary ignition circuit may be traced from the grounded circuit interrupting switch 13 through the induced winding 28, the switch arm 7, the particular contact 6 engaged by the switch arm, to the corresponding sparking terminals 5.

The shaft 29 of the engine which is directly driven by the engine cranks is understood to extend from the engine crank case diagrammatically illustrated in Fig. 1 into the housing 30 which surrounds the clutching mechanism and transmission mechanism. The load shaft is composed of two sections 31 and 32 which are coupled by a universal joint 33, the load shaft section 32 being driven through the intermediation of the coupling devices illustrated in Fig. 1 in a manner well known. Where the engine is employed to operate an automobile the load shaft section 31 extends to the differential gearing in driving relation to the sections of the rear automobile wheel driving shaft. The fly wheel 34 of the engine is keyed upon the directly driven engine shaft 29. This fly wheel carries a number of stub shafts 35 projecting from one face thereof. Three spur gears 36, 37 and 38 of different diameters are mounted to turn upon each stub shaft, these spur gears being integrally formed in one structure. The spur gears 38 are in constant mesh with a pinion 39. This pinion 39 is affixed with respect to a quill shaft 40 that is coaxial with the shaft 29 and is adapted to be turned with respect thereto. This quill shaft 40 constitutes a hub extension of a wheel 41 which is coaxial with the shaft 29 and which is rigidly assembled with the flange extension 42 of the load shaft section 32. The spur gears 37 are in constant mesh with a pinion 43 formed upon quill shaft 44 which bears upon quill shaft 40 and constitutes a hub extension of wheel 45. The spur gears 36 are in constant mesh with a spur pinion 46 formed in a quill shaft 47 constituting the hub of the wheel 48. The rim of the wheel 41 is provided with internal annular grooves which receive the clutching rings 49. These rings surround another clutching ring carrier 50 having external annular grooves which receive the clutching rings 51 that are alternated with the clutching rings 49. The clutch rings are forced into engagement by means of the clutch spring 52, when this spring is free to function. This spring surrounds a sleeve 53 which is carried upon the shaft section 32 and engages the flange 54 at one end. The other end of the spring is in thrusting engagement with the clutch collar 55 which bears against the inner ends of the levers 56 which are pivoted upon the flange extension 42 of the shaft section 32. These levers 56 press upon pins 57 that are carried by a ring 58 which press upon the collection of clutch rings. A yoke 59 spans the clutch collar 55 and carries pins 60 which enter the annular groove 61 in said collar. Said yoke is fixed upon a shaft 62. A rocker arm 63 is clamped midway between its ends upon this shaft. A link 64 couples one end of the rocker arm with the lower end of the clutch lever 65 which is fixed upon a shaft 66. The upper end of the clutch lever 65 is formed with the usual pedal plate 67. The clutch lever 65 is shown in Fig. 1 in neutral position in which the engine is disconnected from the load shaft 31, 32. When the pedal end 67 of the clutch lever is in its extreme left position which is to the left of its neutral position, shown in Fig. 7, the engine is coupled with the load shaft 31, 32 in a manner to drive this shaft at engine speed. When the pedal 67 is in its extreme right position, the adjustment is such that the engine operates the load shaft at reduced or second speed. An abutment 68 cooperates with the spring 52 in defining and holding the three positions of the clutch pedal 67. This abutment is carried upon an arm 69 that is fixed upon shaft 70 to which is also fixed the hand lever 71. A pin 72 is carried by the adjacent end of the rocker arm 63 to define the medium of engagement between said rocker arm and the abutment. This abutment is so shaped as to permit the clutch lever 65 to assume any of its three positions. The lever 71 may be drawn backwardly to cause the abutment 68 to turn the rocker arm 63 in a direction to move the clutch pedal 67 from the left to the right to secure second speed. When the clutch pedal is to be moved from the right to the left the lever 71 is pushed forwardly to permit counterclockwise movement of the rocker arm 63 that is then turned by the spring 52 to secure engine speed. When the clutch lever 65 is turned clockwise either by pressing pedal 67 forwardly or by pulling the arm 71 backwardly the shaft 66 is moved lengthwise, while turning, by the action of the cam 73 upon the lug 74 formed upon the housing 30. The cam 73, during this longitudinal and turning movement of the shaft 66, presses one end 75 of the brake band 76 toward the other end 77 of this brake band which band end 77 is held for movement by the guide 78 upon the housing 30 in which guide the shaft 66 turns and slides. When the brake band 76 is thus contracted it grips the wheel 45 to hold it from rotation, thereby holding the pinion 43 from rotation. Power is then transmitted from the engine to the load shaft 31, 32 by way of the fly wheel 34, the stub shafts 35, the spur gears 37, turning in planetary fashion about the spur gear 43, the spur gears 38, the pinion 39, the quill shaft 40, the wheel 41 and the flange extension 42 upon the load shaft section 32, the load shaft then turning at reduced speed, in the same direction with the engine shaft 29. When the clutch lever 65 is turned counterclockwise to its extreme left position, a result which is occasioned by pushing the lever 71 forwardly, the brake band 76 is released. The shaft 62 is then permitted to be rotated in a counterclockwise direction by the spring 52 to engage the alternative clutching rings 49 and 51. The load shaft 31, 32 is then driven at engine speed, power being transmitted from the engine by way of its fly wheel 34, the clutch member 50, the engaged clutch rings 49 and 51 and the flange extension 42 of the load shaft section 32. When the direction of the load shaft is to be reversed the pedal lever 79 is operated to apply the brake band 80 to the wheel 48, the mechanism for enabling this lever 79 to apply this brake band being similar to that which is employed in effecting the application of the brake band 76. When the wheel 48 is gripped by the band 80 the pinion 46 upon the quill shaft 47 that constitutes the hub of the wheel 48 is held from rotation causing the load shaft 31, 32 to be turned oppositely to the engine shaft 29, and at reduced speed, power being transmitted from the engine by way of the fly wheel 34, the stub shafts 35, the spur gears 36, traveling in planetary fashion about the pinion 46 in mesh therewith, the spur gears 38 greater in diameter than the spur gears 36, the pinion 39 meshing with spur gears 38, the quill shaft 40, the wheel 41 and the flange extension 42 of the load shaft section 32. When the load shaft is to be brought to rest, the clutch lever 65 is in neutral and the reversing lever 79 is released, the brake lever 81 being operated to stop the load shaft. This brake lever operates the brake band 82 through the intermediation of the same kind of mechanism employed to apply the brake bands 76 and 80. The brake band 82 thereupon grips the wheel 41 with which the flange extension 42 of the load shaft section 32 is rigidly assembled. The brake bands are released by springs such as the spring 83 shown in Fig. 14 as being interposed between and in spreading relation to the ends of the brake band 76.

The clutch lever 65 and the rocker arm 63 are locked from rotation when said clutch lever is in neutral position by mechanism which will now be described. A housing 84 is rigidly secured to the shaft 62. A locking bar 85 slides in this housing. The reduced end 85' of the locking bar is receivable between the hub 86 and the adjacent end of guide 78 when the lever 65 is in neutral position, Fig. 14. The reduced end 85' of the locking bar then underlies the shaft 66 so that the rocker arm 63 cannot be turned counterclockwise. The locking bar 85 is moved into locking position by means of a cam roller 87 turning upon a crank pin 88 which is provided upon a crank arm 89 upon the shaft 90, see Fig. 8. This cam roller 87 is received in a notch in the bar 85 and moves this bar into locking position or into unlocking position according to the direction of rotation of the shaft 90. A segmental ratchet 91 is fixed upon the shaft 90. This ratchet is turned step by step by the pawl 92 which is carried upon an armature 93. The position to which the ratchet is turned is held by a holding dog 93'. The ratchet is turned a predetermined number of steps to withdraw the locking bar from locking position. The ratchet is turned an additional step in order to place the locking bar in locking position. This latter result is brought about by the pin 94 which engages the dog releaser 95 upon the additional step of the ratchet, the dog releaser then lifting the dog 93' to permit the spring 96 to turn the shaft 90 in a direction to insert the reduced end 85' of the locking bar 85 beneath the shaft 66 and between the lever hub 86 and the adjacent end of the guide 78, Fig. 14. When the clutch lever 65 is thus locked in neutral position the master switch contact 24 in the inducing ignition circuit is placed out of connection with the contacts 22. When the shaft 90 is turned step by step to a position in which the cam roller 87 withdraws the locking bar 85 from beneath the shaft 66 the contact 24 is engaged with the contacts 22 to permit the ignition circuit to be employed.

The armature 93 is attracted by the magnetizable core 97 having thereon two windings, one winding comprising a single coil 98 and the other winding comprising two coils 99 and 100, both windings requiring energization to effectively magnetize the core 97. An insulating ring 101 has teeth 102 thereon corresponding to the number of step by step movements required of the ratchet 91 to withdraw the locking bar 85 from locking position, in this instance 8 in number. Each time a tooth 102 lifts the spring 103, this spring contacts with the contact spring 104 and the contact spring 104 contacts with the contact spring 105. The circuits for the two windings of the core 97 are thereby established. The circuit of the winding 98 is traceable from ground through this winding the contact 104 the contact 105 to the grounded battery 14. The circuit for the winding 99, 100 is traceable from ground through the coil 100, the contact 106, the contact 107 which is then engaged with the contact 106 by means of an unnotched portion of the ring 108 which turns in unison with ring 101, the coil 99, the contact 103, the contact 104, the contact 105, to the grounded battery 14. The ring 108 has three notches 109, 110 and 111 formed therein. The notches 111 and 110 being respectively the shallowest and the deepest and the notch 109 being of intermediate depth. The contact 107 has a hump 112 receivable in any of these notches. When this hump is received in the notch 109 all circuits are opened. When the hump is received in the notch 111 the battery 14 is included in the inducing charging circuit by way of the contacts 20 and 21. When the hump is in the notch 110 the magneto generator 15 is included in the inducing ignition circuit by way of the contacts 21 and 27.

The master ignition switch contact is carried upon the shaft 90 and is so positioned as to connect the contact 22 to complete the inducing ignition circuit when the engine is coupled in driving relation with the load shaft 31, 32.

When the ring 108 is turned to bring hump 112 into notch 109 to exclude both the battery and magneto generator from the inducing ignition circuit the tooth 113 passes beneath the free end of contact spring 103 to again connect this spring with contacts 104 and 105 to again effectively energize core 97, thereby causing pin 94 to engage the dog releaser 95 to disengage dog 93' from the ratchet and permit spring 96 to turn shaft 90 in a direction to insert the locking bar 85 between the lever hub 86 and adjacent end of guide 78 to lock the engine out of driving relation with the load shaft 31, 32.

The rings 101 and 108 are fixedly assembled by the riveting pins 114 (Fig. 3). These rings and the contacts controlled thereby are contained in a cylindrical casing 115, the contacts being mounted upon a disc 116 assembled with the rear end of the casing by means of bayonet slots in the cylindrical wall of the casing. The two rings are rotated by a lock barrel 118 whose inner end enters and is in driving connection with ring 101. This lock barrel turns within the lock casing 119 that contains inwardly spring pressed plungers 120 whose inner ends may enter holes in the side of the lock barrel to hold the barrel and the rings 101 and 108 from turning. This result occurs when the hump 112 on spring arm 107 enters notch 109, that is when the engine is out of driving relation with the load shaft 31, 32. When the key 121 is inserted into the lock barrel it moves the tumblers 118 outwardly to eject the plungers 120 from the lock barrel to permit the key to turn the lock barrel and the rings 101 and 108 to effect the adjustments hitherto described.

Changes may be made without departing from my invention.

Having thus described my invention, I claim:

1. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, and means for operating said member.

2. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, and electro-magnetic means for operating said member.

3. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, and means to impart a step-by-step movement to member.

4. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, a crank for moving said member, and means for imparting a step-by-step movement to said crank.

5. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a slidable member projectible to and retractible from a position between said stop member and said housing, and means for projecting and retracting said member.

6. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a slidable member projectible to and retractible from a position between said stop member and said housing, spring means constantly tending to project said member to a position between said stop member and housing, and means for retracting said member step-by-step from such position.

7. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, and a pawl and ratchet mechanism for moving said member step-by-step from such position.

8. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, a pawl and ratchet mechanism for moving said member step-by-step from such position; and electro-magnetic means operable intermittently to actuate said pawl and ratchet mechanism.

9. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a member movable to a position between said stop member and said housing to prevent longitudinal movement of said shaft in a brake applying direction, a pawl and ratchet mechanism for moving said member step-by-step from such position; and electro-magnetic means operable intermittently to actuate said pawl and ratchet mechanism, said electro-magnetic means being inclusive of a plurality of separate windings and a separate switch in controlling relation to each winding.

10. In combination with a transmission gear including a housing, a brake band, a rotatable shaft operatively connected with said brake band longitudinally movable to apply same, means to produce longitudinal movement of said shaft upon rotation thereof, and a stop member on said shaft engageable with a portion of said housing to limit longitudinal movement of said shaft in a brake applying direction; a casing mounted adjacent to said shaft, a lock bar slidably mounted in said casing for projectible movement to a position between said stop member and said housing and for retractible movement from such position, and mechanism within said housing for projecting said bar and for retracting same step-by-step from a projected position.

In witness whereof, I hereunto subscribe my name.

HARRY A. DOUGLAS.